(No Model.)

E. G. CONE.
THREAD HOLDER FOR SPOOLS.

No. 376,858. Patented Jan. 24, 1888.

Witnesses
Frank H. Pierpont
G. W. Royce

Inventor
Ernest G. Cone
By his Attorneys
Simonds & Burdett

UNITED STATES PATENT OFFICE.

ERNEST G. CONE, OF EAST HAMPTON, CONNECTICUT.

THREAD-HOLDER FOR SPOOLS.

SPECIFICATION forming part of Letters Patent No. 376,858, dated January 24, 1888.

Application filed April 4, 1887. Serial No. 233,687. (No model.)

*To all whom it may concern:*

Be it known that I, ERNEST G. CONE, of East Hampton, in the county of Middlesex and State of Connecticut, have invented certain new and useful Improvements in Spools, of which the following is a full, clear, and exact description, whereby any one skilled in the art can make and use the same.

My invention relates to the class of devices on which thread of any material is wound for the purpose of convenience in storage, shipment, or use; and its object is to provide a spool with improved means for holding the end of the thread, so as to prevent it from unwinding.

To this end my improvement consists in a spool having a radial slit in one of the faces adapted to hold one arm of a holder, in combination with a holder formed of a single L-shaped piece of sheet metal that is held in the socket, so that one of its arms lies flat upon and along the periphery of the spool at one end for a short distance, as more particularly hereinafter described, and pointed out in the claim.

Figure 1:
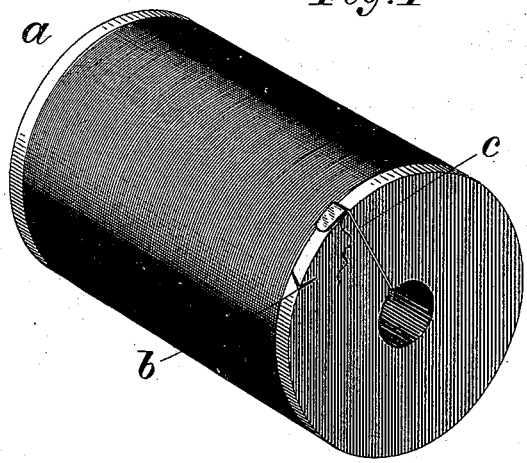
Figure 2:
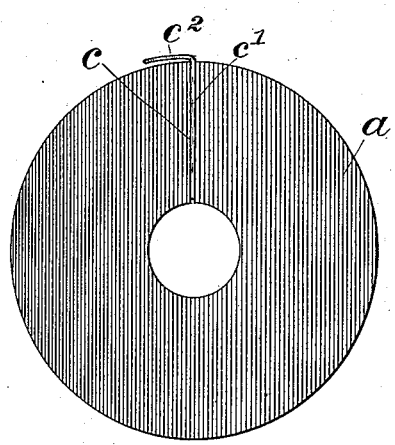
Figure 3:
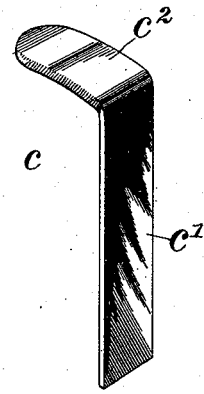

Referring to the drawings, Figure 1 is a perspective view of a spool of thread embodying my invention. Fig. 2 is an end view of the spool, on an enlarged scale, showing the preferred form of the thread-holder. Fig. 3 is a detail view of the metallic holder removed from the spool.

In preparing thread or filaments of various materials for sale it is customary to wind it on spools and to fasten off the thread by catching the end into a slit or nick cut into the corner or edge of the spool at one end, and in the accompanying drawings the letter $b$ denotes such a nick cut into the edge of the spool $a$, while $c$ denotes the preferred form of my improved thread-holder that is secured to the spool. The nick becomes useless by the chipping off of the wood, and, owing to the difficulty in finding the nick and engaging the thread therein, a great waste of it in use is caused by the neglect or failure of the user to fasten the end after using a piece from the spool.

The holder $c$ is made of a strip of flat metal with a stem or body part, $c'$, that is adapted to be secured in a socket in the end of the spool in such manner that the jaw $c^2$ will lie flatwise along the end in proper position to catch the thread under it and prevent the unwinding of the thread from the spool.

I find the only practical method of securing the holder $c$ to the spool to consist in cutting a crosswise socket, usually radially, (see Fig. 1,) in one end of the spool and driving the holder edgewise into it, so that the jaw $c^2$ lies along close to and flatwise on the periphery of the end of the spool. In this position the holder is firmly secured, may be covered by the label usually pasted on the spool end, and the outer edge of the jaw forms a convenient cutter for severing the thread. It is obvious that my improved holding device is adapted for use on all spools without regard to the material that is wound upon them, although it is particularly intended for use on spools of cotton, linen, or silk filaments, or cord, or yarn, or worsted.

I claim as my improvement—

In combination with a spool having a slit in one of its faces, forming a cutter-socket, a cutter made of a single L-shaped piece of sheet metal, having one of its prongs seated and held in the said slit and the other prong forming a flat jaw that lies upon the periphery of the spool-head, all substantially as described.

ERNEST G. CONE.

Witnesses:
CHAS. L. BURDETT,
A. B. JENKINS.